United States Patent Office 2,811,285
Patented Oct. 29, 1957

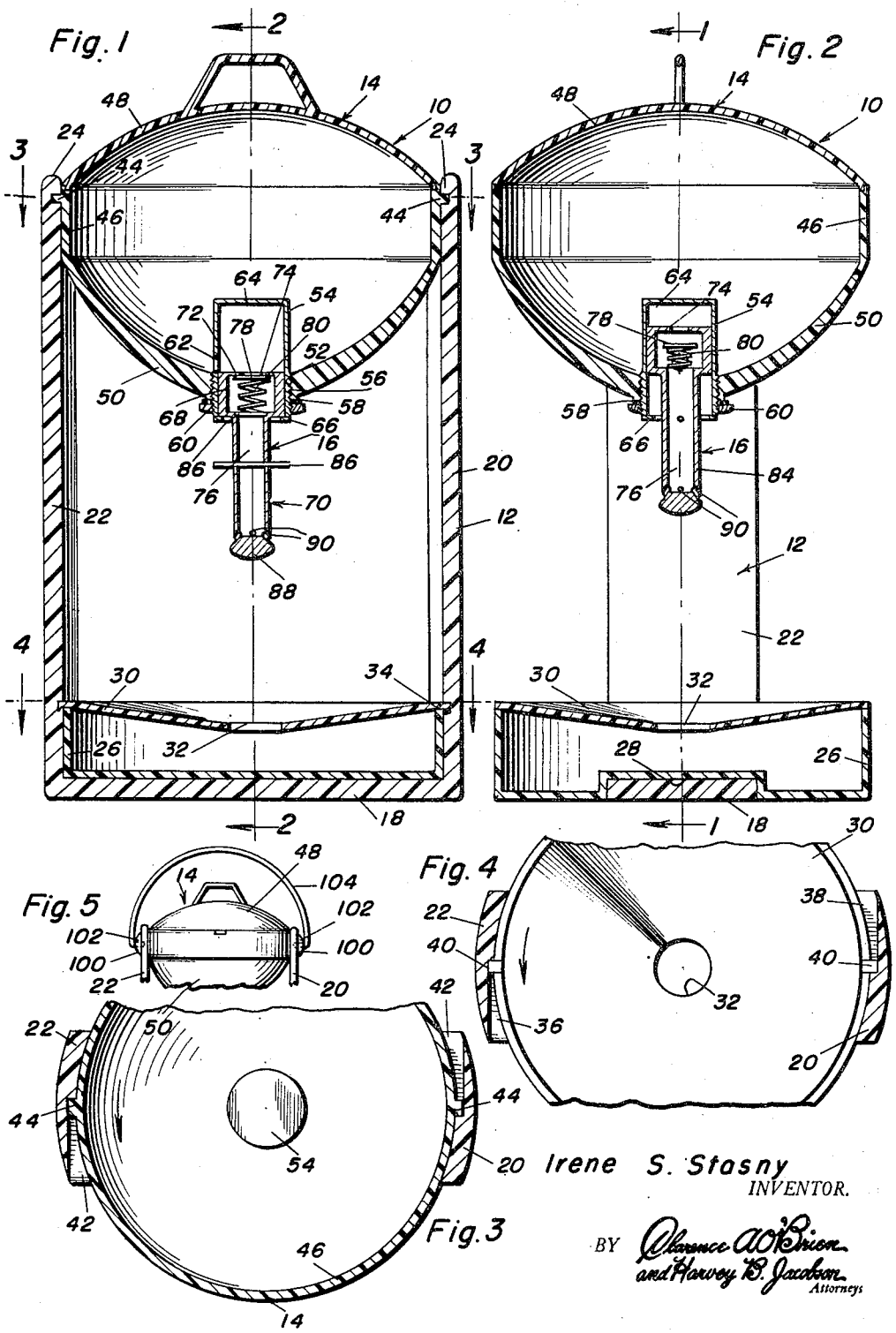

2,811,285

LIQUID DISPENSER

Irene S. Stasny, San Antonio, Tex., assignor of five percent to Rosa G. Medlin, five percent to Thomas C. Eskridge, and five percent to Frank J. Stasny, Jr., San Antonio, Tex.

Application May 27, 1955, Serial No. 511,564

1 Claim. (Cl. 222—185)

This invention relates generally to hand operated liquid dispensers, and is more particularly concerned with a readily available and highly efficient liquid dispenser which may contain a suitable detergent fluid for cutting grease, food particles etc., as well as dispelling odors left on a person's hands during the process of eating or preparing foods.

A further object of invention in conformance with that set forth above is to provide a liquid dispensing device which includes a liquid container in communication with a hand manipulable valve control mechanism for permitting liquid to be dispensed, in conjunction with an underlying catch pan which will receive excess liquid being dispensed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a vertical sectional view of the novel liquid dispenser taken substantially on line 1—1 of Figure 2;

Figure 2 is a vertical sectional view taken substantially on line 2—2 of Figure 1;

Figure 3 is a horizontal sectional view taken substantially on line 3—3 of Figure 1 showing the manner for readily removing the liquid container and valve control mechanism;

Figure 4 is a fragmentary horizontal sectional view taken substantially on line 4—4 of Figure 1; and Figure 5 is a fragmentary elevational view on a reduced scale showing how a bail type handle may be incorporated on the liquid dispenser.

Indicated generally at 10 is the liquid dispenser which includes a suport frame 12, a liquid container 14 and a dispensing valve assembly 16.

The support frame 12 includes a lower base portion 18 terminating in a pair of vertically extending support arms 20 and 22 and support at their upper ends 24 liquid container 14. A catch pan 26 is carried on the lower portion 18 of the frame by means of a grooved portion 28 contained in the bottom of said pan, as most clearly seen in Figure 2. A cover plate 30 having a concaved upper surface is secured in overlying relationship to the catch pan 26, the concave cover plate terminating in a central open aperture 32 permitting excess liquid or drippings from the dispensing valve assembly 16 to be directed into the catch pan 26. The vertically extending supports 20 and 22 include adjacent the upper edge 34 of the catch pan 26 horizontally disposed upwardly flared notch portions 36 and 38, respectively, which are diametrically opposite on the vertical support members 20 and 22 and which permit the rotatable reception of radial securing ears 40 of the cover plate 30 thus permitting ready removal of said cover plate.

Removal of the cover plate 30 will also permit the removal of catch pan 36 from the support frame 12 in a manner which is believed readily apparent.

It will be noted that the vertical support members 20 and 22 include adjacent the upper ends 24 thereof additional horizontally disposed outwardly flared slotted portions 42, see Figure 3, which removably receive attaching ears 44 extending radially from the side wall 46 of the liquid container 14.

Rotation of both the liquid container 14 and the cover plate 30 as indicated by the arrows in Figures 3 and 4 will readily permit the removal of said liquid container and cover plate from the support frame.

A suitable cover member 48 is removably supported on the side walls 46 of the liquid container 14 for permitting the re-filling of said liquid container with a suitable detergent liquid such as a mixture of vinegar and water or lemon and water which will aid in dispelling food odors and removing or cutting the grease residue which accumulates on a person's hand during eating. The side walls 46 of the liquid container 14 terminate in a downwardly curved bell-shaped portion 50 which has a centrally located threaded portion 52 for threadedly receiving a cylinder element 54 of the dispensing valve assembly 16. The cylinder element 54 includes a threaded portion 56 extending out of the liquid container 14 and which has concentrically disposed thereon a sealing washer 58 which is retained against the bell-shape portion 50 of the liquid container 14 by means of a suitable lock nut 60. The cylinder element 54 includes in communication with the interior of the liquid container 14 a side wall aperture 62 which permits the liquid contained in the liquid container 14 to enter into the interior 64 of said cylinder.

The cylinder element 54 includes on the portion extending out of the liquid container 14 an annular flange 66 which reciprocably retains an enlarged annular portion 68 of a plunger element 70 of the dispensing valve assembly 16. The enlarged portion 68 of the plunger element 70 includes an annular shoulder portion 72 contained in the compartment 64 of the cylinder element 54 providing a central aperture 74 in said plunger element. Communication between the chamber 64 of the cylinder element 54 and the interior 76 of the plunger element is prevented by a sealing element 78 generally urged into contact about the aperture 74 of said plunger element by means of a compression spring 80 interposed between said sealing element 78 and a suitable shoulder 82 of said plunger element. The plunger element includes a reduced diameter nozzle portion 84 extending out of the cylinder element 54, said nozzle portion including a suitably secured transverse stop rod 86 therethrough, and including on its lower end 88 a plurality of liquid dispensing apertures 90.

Thus after the liquid container 14 has been filled with the detergent fluid, the chamber 64 of the cylinder element 54 will be filled with the fluid contained in said liquid container by virtue of the aperture 62 in said cylinder element, the fluid is retained in said chamber 64 by virtue of the sealing element 78 spring urged against the aperture 74 of the plunger element 70. When it is desired to clean one's hands in the manner heretofore described, pressure is applied to the end 88 of the plunger element 70 whereupon the enlarged portion 68 thereof moves upwardly closing off communication between the liquid container 14 and the interior 64 of the cylinder element 54. Continued upward movement of said plunger element results in a build-up of pressure within the chamber 64 whereupon said pressure overcomes the compression spring 80, as seen in Figure 2, resulting in liquid being dispensed out of the apertures 90 of the plunger element.

As seen in Figure 5 the support arms 20 and 22 may have molded thereon radially extending attaching ear portions 100 adjacent the upper end thereof, each of said ear portions including a radial aperture into which an angular end 102 of an elliptical or semi-circular resilient bail type handle 104 is secured. Said handle aiding in retaining the arms 20 and 22 in rigid association with the liquid container 14.

Various positional directional terms such as "front," "top," etc., are utilized herein to have only a relative connotation to aid in describing the device and are not intended to require any particular orientation thereof with respect to any external element.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A liquid dispenser comprising a support frame, a liquid container carried by said frame and having a bottom portion, an upright cylinder fixed in and extending through said portion upwardly into said container, said cylinder forming a chamber therein closed at its top and having a side opening communicating the chamber with said container, a hollow plunger depending out of said chamber and vertically slidable by gravity downwardly into a position below said opening to permit liquid to pass from said container into said chamber above said plunger, said plunger being manually slidable upwardly in said chamber to close said opening and create pressure in said chamber, and pressure responsive spring-loaded means in an upper end of said plunger opening under pressure in said chamber to admit fluid from said chamber into said plunger.

References Cited in the file of this patent
UNITED STATES PATENTS

| | | |
|---|---|---|
| 1,256,434 | Bozzella | Feb. 12, 1918 |
| 2,658,648 | Tribbitt | Nov. 10, 1953 |